No. 613,374. Patented Nov. 1, 1898.
T. J. JONES.
NECK YOKE.
(Application filed Dec. 16, 1897.)
(No Model.)
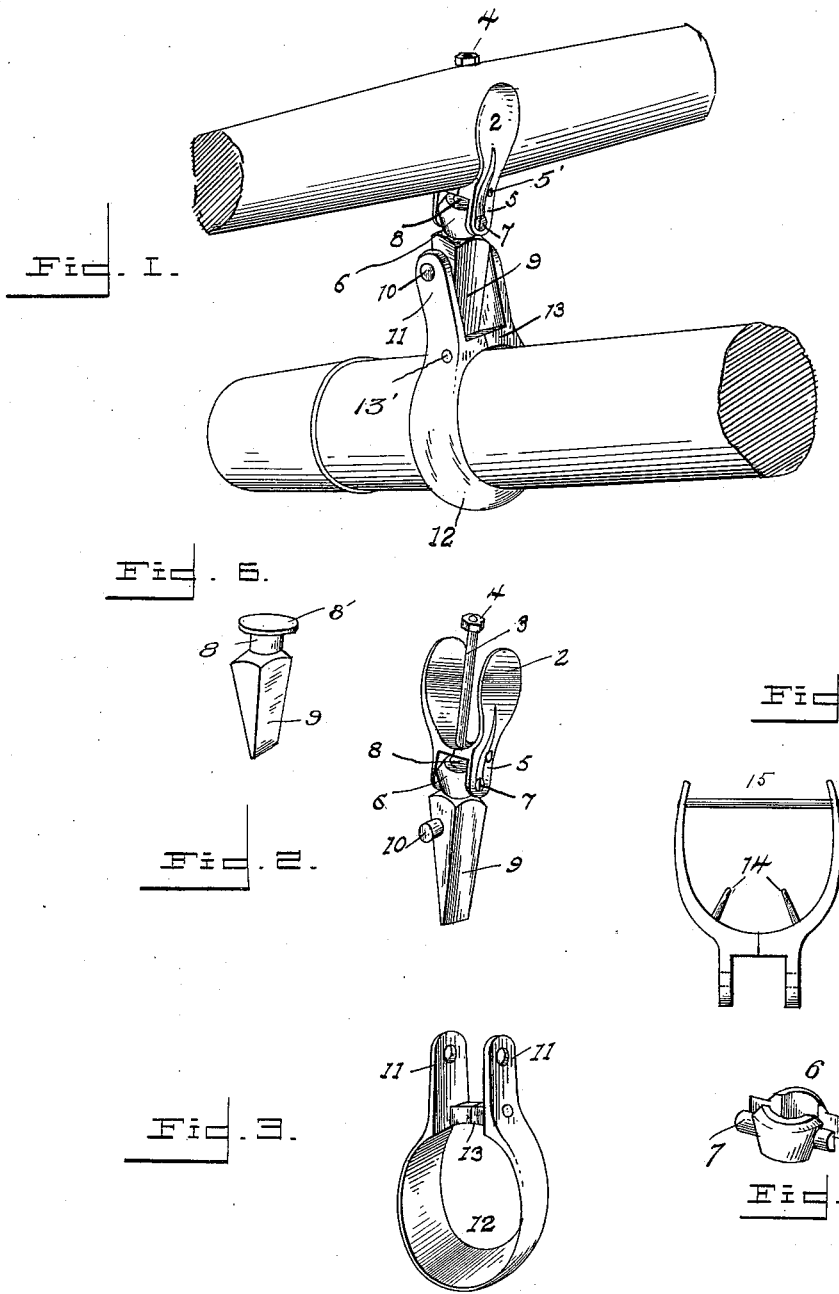
Witnesses:
Fenton S. Belt,
Benj. E. Cowl.
Inventor:
Tilford J. Jones,
by H. B. Willson & Co.,
Attorneys.

UNITED STATES PATENT OFFICE.

TILFORD J. JONES, OF MANDEVILLE, MISSOURI.

NECK-YOKE.

SPECIFICATION forming part of Letters Patent No. 613,374, dated November 1, 1898.

Application filed December 16, 1897. Serial No. 662,129. (No model.)

*To all whom it may concern:*

Be it known that I, TILFORD J. JONES, a citizen of the United States, residing at Mandeville, in the county of Carroll and State of Missouri, have invented certain new and useful Improvements in Neck-Yokes; and I do declare the following to be a full, clear, and exact description of the invention, such as will enable others skilled in the art to which it appertains to make and use the same.

My invention has relation to neck-yokes; and the object is to provide a device of this character for supporting the poles of vehicles whereby should the traces or tugs become broken or disconnected the neck-yoke will automatically lock itself to the poles, and thereby prevent the separation or unhitching of the team from the vehicle.

With this object in view the invention consists in certain features of construction and combination of parts, which will be hereinafter fully described and claimed.

In the accompanying drawings, Figure 1 is a perspective view of a neck-yoke, illustrating the application of my invention. Fig. 2 is a similar view of a yoke-clip and the swiveled dog connected thereto. Fig. 3 is a similar view of the pole-stirrup. Fig. 4 is a view of another form of yoke-clip. Fig. 5 is a detail perspective view of the ring, and Fig. 6 is a perspective view of the dog.

In said drawings, 2 denotes the yoke-clip, provided with a central post 3, that extends through the yoke and is fastened in place by a nut 4. This clip consists of two parts fastened together by a long rivet 5' and is provided with parallel ears 5, having apertures that receive the studs 7 of a ring 6, which also consists of two parts.

9 denotes the dog, which is preferably wedge form and is provided with a tenon 8, having a flange 8', that is connected with the ring 6 in any suitable manner, preferably by swiveling.

12 denotes the pole-stirrup, which is provided with parallel ears 11, having apertures through which project the tenons 10 of the dog. The stirrup is provided with a split cross-bar or bridge 13, designed to limit the movement of the dog, and a rivet 13' passes through the bridge to hold the parts together.

When the parts are arranged as shown in Fig. 1, should the traces or tugs break it will be seen that the yoke will not become detached from the pole for the reason that the dog will be buried into the pole and firmly clamp the stirrup thereto, the bridge 13 serving to prevent the dog swinging too far rearward and becoming disengaged from the pole.

In Fig. 4 I have shown another form of yoke-clip. This clip is provided with short upwardly-projecting studs 14 and a transverse bolt 15, by means of which it is firmly secured to the yoke.

Although I have specifically described the construction and relative arrangement of the several elements of my invention, I do not desire to be confined to the same, as such changes or modifications may be made as clearly fall within the scope of my invention without departing from the spirit thereof.

Having thus described my invention, what I claim, and desire to secure by Letters Patent, is—

1. An attachment for a yoke, comprising a yoke-clip having parallel ears, a ring swiveled between said ears to rock in one direction, a dog secured to said ring, and a stirrup pivoted to said dog to rock in a direction opposite to that of the ring, substantially as set forth.

2. The combination with the yoke, of a clip secured thereto provided with parallel ears, a ring having integral studs swiveled in said ears, a dog swiveled to said ring, and a stirrup pivoted to said dog, substantially as set forth.

In testimony whereof I hereunto affix my signature in presence of two witnesses.

TILFORD J. JONES.

Witnesses:
MITCHELL BLOCK,
C. A. MORRIS.